United States Patent Office 3,573,253
Patented Mar. 30, 1971

3,573,253
PREPARATION OF CROSS-LINKED POLY (4-HYDROXY - 3 - NITRO) (NONSUBSTITUTED OR ALPHA AND/OR BETA SUBSTITUTED) STRYENE
Don N. Gray, Okemos, Mich.
(5503 Brixton Drive, Sylvania, Ohio 45360)
No Drawing. Filed Nov. 18, 1968, Ser. No. 776,807
Int. Cl. C07c *103/52;* C08f *7/10;* C08h *1/00*
U.S. Cl. 260—47       11 Claims

ABSTRACT OF THE DISCLOSURE

There is disclosed a process for preparing a solid phase, polymeric substrate comprising a cross-linked poly (4-hydroxy-3-nitro) styrene which is especially suitable for the synthesis of polypeptides. The polystyrene may be nonsubstituted or substituted (alpha and/or beta).

---

This invention relates to the preparation of a solid phase polymeric substrate for the synthesis of polypeptides. More particularly, this invention relates to the preparation of cross-linked poly (4-hydroxy-3-nitro) styrene (including both nonsubstituted and alpha and/or beta substituted styrenes).

The synthesis of polypeptides is an important area of medicinal, agricultural and biochemical research, particularly enzyme and hormone research relating to many fields of industry and medicine. In the medical field, the synthetic preparation of pituitary hormones and anticarcinogenic extracts has initiated what can be called a major industry.

Classically sequential polypeptides have been prepared by extremely laborious techniques wherein the intermediates have been isolated after the addition of each amino acid moiety. This has made the synthesis complicated and the preparation of long chain polypeptides nearly impossible because of low yields and/or racemization. In 1963, Merrifield (J. Am. Chem. Soc., 85, 2149) and Lefsinger and Kornet (J. Am. Chem. Soc., 85, 3045) suggested the use of an insoluble polymer support for the growing peptide chain. This process permitted the purification of the growing peptide chain, prepared by classical synthetic methods, without isolating the intermediate. In such a process, the insoluble polymer support is simply washed with the desired purification solvents, the next amino acid residue and co-reactants then being added to the solid phase support and the reaction continued. Merrifield reported automating this procedure (Science, 150, 178, 1965) to yield, except for the final cleavage step, the final polypeptide essentially unattended. Bayer later prepared apoferredoxin, a 55-amino acid sequence enzyme, using the automated Merrifield technique with a resulting 57% overall yield (Apr. 22, 1968, Chemical and Engineering News, page 29).

Since the disclosure of the original Merrifield technique which comprises using a partially chloromethylated cross-linked polystyrene resin substrate, other polymeric substrates have been suggested for the solid phase synthesis of polypeptides. Thus, Khorana (J. Am. Chem. Soc., 89, 3880, 1967) used a trityl chloride substituted soluble polymer. An insoluble modification of the Khorana resin was reported by a Du Pont group (J. Am. Chem. Soc., 89, 450, 1967). A research group at the Monsanto Company working in the area of pituitary hormones reported using two insoluble polymer supports based on modified maleimide copolymers (Spring 1968 American Chemical Society Meeting).

In the Merrifield process (including reported modifications thereof) final cleavage of the polypeptide chain from the substrate is sometimes difficult and a number of cleavage reagents have been proposed including acetic acid —HBr, trifluoracetic and liquid HF. This final cleavage step often results in low overall yields for the entire polypeptide synthesis.

In a variation of the Merrified technique, Fridkin, Patchornik and Katchalski (J. Am. Chem. Soc., 87, 4646, 1965; 88, 3164, 1966) proposed a procedure wherein a *single* activated amino acid is bound to a polymer matrix. When this bound polymeric reagent is reacted with a solution of a protected amino acid or a polypeptide, it reacts to add the amino acid residue and automatically cleaves from the polymeric matrix. The growing polypeptide is then deblocked and reacted with another resin having another reactive amino acid. This system can also be automated since the solution of the growing peptide may simply be passed from one resin column to another and so on. Using this technique, the final cleavage reaction typical of the Merrifield type synthesis is eliminated. Thus, to prepare a polypeptide with the Katchalski et al. process, there is merely required an arsenal of the activator support resins with various blocked amino acids coupled to them. The sequence in which they are used determines the sequence of the amino acid residues in the polypeptide chain.

A typical polymeric, solid phase substrate used by the Katchalski et al. process is poly-4-hydroxy-3-nitrostyrene cross-linked by 4% divinylbenzene and having the structure:

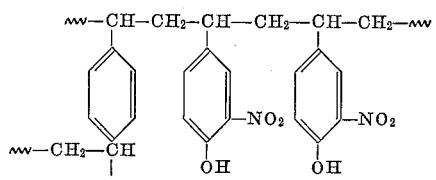

The polymeric substrate of the Katchalski et al. process is typically prepared by the Packham technique (J. Chem. Soc., 1964, 2617) which comprises copolymerizing 4-acetoxystyrene with divinylbenzene, hydrolyzing the acetoxy group of the polymer, and then nitrating to the desired solid phase product. The key to this synthesis route is 4-acetoxystyrene. The logical precursor to this, 4-hydroxy styrene or para-vinylphenol, is unfortunately not known in the monomeric state. Accordingly, Packham prepared his 4-acetoxystyrene by the synthetic route of Corson et al. (J. Org. Chem., 23, 544, 1958) which comprises a complex and lengthy preparation, e.g. a four step synthesis from phenol and acetic acid, which results in a low overall yield of 4-acetoxystyrene.

In the practice of this invention, there is provided a process for preparing polypeptides which overcomes some of the disadvantages of the prior art processes, e.g., as disclosed by Katchalski et al., and Packham; that is, there is provided a process for preparing a solid phase, polymeric, activator support resin which is not dependent upon the preparation and use of 4-acetoxystyrene.

More particularly, in accordance with this invention, there is provided a process for preparing a solid phase, polymeric material which comprises reacting a 4-alkoxy styrene with a suitable cross-linking agent in the presence or absence of a catalyst so as to form cross-linked, poly (4-alkoxy)styrene, nitrating the cross-linked poly (4-alkoxy) styrene so as to form cross-linked poly (4-alkoxy-3-nitro) styrene, and then reacting the cross-linked poly (4-alkoxy-3-nitro) styrene with an alkoxy cleavage agent so as to form a cross-linked poly (4 - hydroxy - 3 - nitro) styrene.

The use of monomers such as 4-alkoxy styrene as practiced in the process of this invention has distinct advantages relative to the prior art reliance upon 4-acetoxystyrene. Thus, for instance, 4-alkoxy styrene is readily available and, in any case, is easy to prepare relative to 4-acetoxystyrene which must be specifically prepared via a complex synthesis.

Likewise, 4-alkoxy styrene monomers can typically be polymerized using a pearl polymerization process and thus provide an excellent forum for preparing the resin substrate(s) in the form of porous, micro-beads. For instance, pearl polymerization of an aqueous suspension of 4-alkoxy styrene monomer(s) occurs readily to produce micro-beads of certain selected sizes. Thus, in accordance with the specific embodiment of this invention, there is provided a process for controllably preparing the solid phase, polymeric material in the form of porous, finely-divided beads or pearls.

More particularly, there is provided a bead or pearl (suspension) polymerization process which comprises suspending a 4-alkoxy styrene and a suitable cross-linking agent in an aqueous reaction media such as water in the presence or absence of a surface active agent and/or catalyst, stirring the reaction media so as to produce spherical monomer droplets of controlled particles size, and then polymerizing the droplets so as to form porous, micro-beads or pearls comprising cross-linked poly (4-alkoxy) styrene. Typically, the beads are mono-disperse and the size thereof may be controlled within a narrow range. The beads are suitably recovered from the aqueous media and then nitrated and reacted with an alkoxy cleavage agent so as to form a cross-linked poly (4-hydroxy-3-nitro) styrene.

A pearl or bead polymerization process using an aqueous suspension system cannot be undertaken with 4-acetoxy-styrene because it is hydrolytically unstable. However, 4-alkoxy styrene is completely stable under hydrolytic conditions and can thus be readily polymerized in an aqueous suspension system.

In the practice of this invention, it is contemplated that the 4-alkoxy styrene may be alpha and/or beta substituted or non-substituted. Thus, as used herein, 4-alkoxy styrene is defined as alpha and/or beta substituted or non-substituted as represented by the structure:

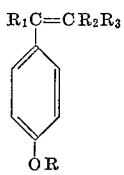

$$R_1C=CR_2R_3$$

where R is selected from unsubstituted, branched or straight chained alkyls of one to four carbon atoms and $R_1$, $R_2$ and $R_3$ are the same or different members compatibly selected from hydrogen, chlorine, bromine, fluorine, branched or straight chained alkyls of one to ten carbon atoms compatibly substituted with chlorine, bromine, or fluorine.

Examples of alkyls from which R can be selected include not by way of limitation, methyl, ethyl, propyl, butyl, isopropyl, isobutyl, and tert-butyl.

Examples of alkyls from which $R_1$, $R_2$ and $R_3$ can be selected include not by way of limitation, methyl, ethyl, propyl, butyl, pentyl, hexyl, heptyl, octyl, nonyl, decyl, isopropyl, isobutyl, isohexyl, trifluoromethyl, pentafluoroethyl, and 2,2,2-trifluoroethyl.

Thus, examples of 4-alkoxy styrene contemplated herein include non-substituted styrenes such as 4-methoxystyrene, 4-ethoxystyrene, 4-propoxystyrene, and 4-butoxystyrene; alpha substituted styrenes such as 4-alkoxy alpha-methyl styrenes, 4-alkoxy-alpha-fluorostyrenes, 4-alkoxy-alpha-trifluoromethyl styrenes; beta substituted styrenes such as 4-alkoxy-beta-fluorostyrene, 4-alkoxy-isopropenyl styrene, 4-alkoxy-beta-bromostyrene; and alpha and beta substituted styrenes such as 4 - alkoxy - $\alpha,\beta,\beta$ - trifluorostyrene.

Examples of suitable cross-linking agents contemplated herein include divinyl compounds such as para-divinyl benzene, meta-divinylbenzene, vinyl cyclohexene, butadiene, diisopropenylbenzene, 1,4-divinyl cyclohexene, glycol dimethylacrylate and divinyl acetylene.

The nitrating of the poly (4-alkoxy) styrene may be by any convenient means. Thus, it is contemplated using any nitrating agent in the presence or absence of a suitable catalyst. Examples include the use of fuming nitric acid alone or in the presence of sulfuric acid (oleum) wherein the sulfuric acid serves as a dehydrating agent; nitric acid in conjunction with acetic anhydride in acetic acid; nitric acid in the presence of boron trifluoride; and nitrogen tetraoxide in sulfuric acid. Typically, the nitration is conducted at a low temperature so as to prevent degradation, e.g. oxidation, of the polymer. The optimum temperature is about $-10°$ C. to about $10°$ C., depending upon the selected nitration agent.

The cleavage of the alkoxy group to form 4-hydroxy may be any suitable means. In one highly preferred embodiment hereof, there is used boiling 48% by weight HBr. Examples of other cleavage agents include hydrogen bromide or hydrogen iodide in glacial acetic acid. Although the cleavage can be undertaken at lower (non-boiling) temperatures, such is not very advantageous below about $50°$ C. Some known cleavage agents such as boron trihalides and aluminum chloride cannot be used because of interaction with the nitro groups in the meta position. For the same reason, basic cleavage agents such as sodium amide, sodium hydroxide, pyridine and sodium in liquid ammonia cannot be used.

Typically, the non-bead forming polymerization will be conducted in solution and will comprise dissolving the styrene monomer and the cross-linking agent in a suitable solvent. Solvents for such solution polymerization may be chosen from aliphatic or aromatic, chlorinated or nonchlorinated hydrocarbons such as hexane, heptane, cyclohexane, methylcyclohexane, benzene, toluene, xylene, methylene dichloride, etc.

The polymerization may be conducted in the presence or absence of a catalyst. If a catalyst is used, it can be selected from any of the convenient and readily available radical producing catalysts including the peroxides, persulfates, or other catalysts, such as benzoyl peroxide, lauroyl peroxide, butyryl peroxide, succinyl peroxide, acetyl peroxide, t-butyl peroxide, cumene hydroperoxide, diacyl peroxides (e.g. such as disclosed in U.S. Letters Pat. No. 3,352,926), and redox catalysts such as potassium persulfate, ammonium persulfate, and sodium persulfate. Likewise, the catalyst may be an azo compound such as $\alpha,\alpha$-azodiisobutyronitrile, dimethyl-$\alpha,\alpha$-azodiisobutyrate, etc.

The bead forming (suspension) polymerization may be conducted in the absence or presence of selected surface active agents. If no surface active agents are used, high speed stirring will be required in lieu thereof as a means of introducing required energy to the suspension. Such will thereby result in decreased control of the bead or pearl size. Thus, in a preferred embodiment hereof, a surface active agent is used, more preferably in combination with a predetermined amount of stirring.

Typical surface active agents which can be utilized for the suspension of the monomers in droplet form include sodium acrylate, sodium polymethacrylate, gelatin, salts of sulfonated paraffin oils, sodium dodecyl sulfate, disoduim hydrogen phosphate dodecahydrate, and polyvinyl alcohol. In addition, various suspension aids may be used, including inorganic salts such as sodium sulfate, sodium dihydrogen phosphate, etc.

Depending upon the activity of the particular catalyst, if any, which is used, the polymerization temperature of the solution polymerization will vary from about $0°$ C. to about the reflux temperature of the solvent.

For the suspension polymerization, the temperature will vary from about $0°$ C. to about the reflux temperature of the monomers used, the limiting temperature being the boiling temperature of the aqueous suspension medium, e.g. such as distilled water.

Polymerization pressures above atmospheric may be used and may be particularly advantageous by increasing the upper limit of the polymerization temperature for a given system. Likewise, increased pressures may also result in decreased overall reaction time.

The examples hereinafter represent some of the best modes contemplated by the inventor in the practice of this invention.

EXAMPLE I

A mixture of sixty-nine (69) grams of 4-methoxystyrene and eight (8) grams of commercially-available divinylbenzene (comprising 55 percent by weight divinylbenzene and 45 percent by weight para-ethylstyrene) is dissolved in one hundred (100) milliliters of dry benzene. The solution is flushed well with nitrogen and 0.25 gram of azobisisobutyronitrile catalyst is added. The solution is stirred for about twelve (12) hours while being maintained at a temperature of about 60° C. A thick gel is obtained. The gel is washed with anhydrous methanol in a Waring blender, filtered, and dried. The polymer yield is sixty-eight (68) grams, a theoretical yield of about eighty-eight percent (88%).

Twenty (20) grams of the polymer prepared above is added slowly, as a powder, to five hundred (500) milliliters of concentrated nitric acid (70 percent by weight) at a rate sufficient to maintain the nitration reaction temperature at about 3° to 5° C. (using ice/salt bath cooling). The nitrated polymer solution is stirred for two (2) hours while maintaining the ice-salt bath cooling and is then quenched by pouring over ice. After drying the yield is twenty-three (23) grams.

Twenty (20) grams of the nitrated polymer is refluxed with three hundred and fifty (350) milliliters of boiling forty-eight percent (48%) by weight hydrobromic acid for twenty-four (24) hours. The reaction mixture is poured over ice, filtered, and the filter cake is washed with cold aqueous acetic acid (concentration of 2 to 3 percent by weight), followed by a methanol wash. The filter cake is vacuum dried to yield 18.2 grams of powdered polymer having a yellowish-tan color. The nitrogen analysis of the polymer is 8.9 percent by weight, as compared with a theoretical analysis of 8.2 percent and an 8.6 percent analysis reported by Packman (J. Chem. Soc., 1964, 2617). The infra red spectrum is quite similar to that of 3-nitro-4-hydroxytoluene (Nujol mull) and is consistent with spectral data reported by Packham. The polymer exhibits a positive ferric chloride test (phenols) and an intense yellow color with base.

EXAMPLE II

One hundred (100) grams of monomer charge consisting of 4-methoxy styrene and divinylbenzene in the proper ratio to obtain an eight percent (8%) cross-linked polymer, are suspended in three hundred (300) milliliters of distilled (oxygen free) water containing 0.5 gram of sodium lauryl sulfate, 0.5 gram of sodium stearate, one (1) gram of the sodium salt of a low molecular weight polyacrylic acid, five (5) grams of sodium sulfate and 0.5 gram of benzoyl peroxide so as to form small monomer droplets.

The reaction vessel is a one (1) liter, three-necked flask equipped with a mechanical stirrer, condenser, and dropping funnel. The aqueous suspension is maintained at a temperature of about 70° C. by means of an external water bath.

The suspension is stirred rapidly at the 70° C. reaction temperature for eighteen (18) hours. The resulting polymer beads are then recovered from the aqueous suspension by filtering, and the filter cake washed well with water. The recovered, finely-divided porous beads are dried at 80° C. for twenty-four (24) hours and are then nitrated and reacted with a cleavage agent as described in Example I.

EXAMPLE III

A larger average bead size relative to those obtained in Example II, is prepared by suspending the monomer charge of Example II in three hundred (300) milliliters of distilled (oxygen free) water containing one (1) gram of benzoyl peroxide so as to form suspended monomer droplets. The suspension is heated to about 70° C. and efficient agitation is maintained for about twenty-four (24) hours until the suspended monomer droplets are polymerized to a non-tacky, cross-linked bead. The beads are recovered from the suspension by filtration, washed, dried, mono-nitrated, and the alkoxy linkage converted to the hydroxy linkage by cleavage as described in Example II. The finally prepared beads have a large average diameter relative to those prepared in Example II.

EXAMPLE IV

The steps of Example I are repeated using 4-ethoxystyrene instead of 4-methoxystyrene. The molar ratio of divinylbenzene to styrene monomer is the same as in Example I. The recovered powdered polymer is the same as that isolated in Example I as determinated by spectral and elemental analysis.

While this invention has been described and illustrated hereinbefore with respect to certain embodiments and details, it will be obvious to those skilled in the art that modifications may be made which fall within the true spirit and scope of this invention.

I claim:

1. A process for preparing cross-linked, poly (4-hydroxy-3-nitro) (nonsubstituted or alpha or beta substituted) styrene derived from a 4-alkoxy (nonsubstituted or alpha or beta substituted) styrene monomer having the structure

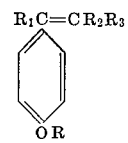

$$R_1C=CR_2R_3$$

OR where R is selected from unsubstituted, branched or straight chained alkyls of one to four carbon atoms and $R_1$, $R_2$, and $R_3$ are the same or different members compatibly selected from hydrogen, chlorine, bromine, fluorine, branched or straight chained alkyls of one to ten carbon atoms compatibly substituted with chlorine, bromine, or fluorine, which process comprises:

polymerizing the 4-alkoxy styrene with a divinyl cross-linking compound so as to form cross-linked, poly (4-alkoxy) styrene, nitrating the cross-linked poly (4-alkoxy) styrene so as to form a cross-linked (4-alkoxy-3-nitro) styrene, and then reacting the cross-linked, poly (4-alkoxy-3-nitro) styrene with an alkoxy cleavage agent so as to form a cross-linked, poly (4-hydroxy-3-nitro) (nonsubstituted or alpha or beta substituted) styrene.

2. The process of claim 1 wherein the 4-alkoxy styrene is a nonsubstituted styrene.

3. The process of claim 2 wherein the non-substituted 4-alkoxy styrene is selected from 4-methoxystyrene, 4-ethoxystyrene, 4-propoxystyrene, and 4-butoxystyrene.

4. The process of claim 1 wherein the 4-alkoxy styrene is an alpha or beta substituted styrene.

5. The process of claim 1 wherein the cross-linked poly (4-alkoxy) styrene is nitrated at a temperature of about −10° C. to about 10° C.

6. The process of claim 5 wherein the cross-linked poly (4-alkoxy) styrene is nitrated with concentrated nitric acid.

7. The process of claim 1 wherein the alkoxy cleavage agent is boiling 48 percent by weight HBr.

8. A process for preparing cross-linked poly (4-hydroxy-3-nitro) (nonsubstituted or alpha or beta substituted)

styrene in the form of finely-divided porous beads or pearls which comprises:

suspending a 4-alkoxy styrene and a divinyl cross-linking compound in an aqueous media, said 4-alkoxy styrene having the structure

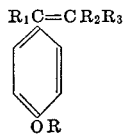

$R_1C=CR_2R_3$

OR where R is selected from unsubstituted, branched or straight chained alkyls of one to four carbon atoms and $R_1$, $R_2$, and $R_3$ are the same or different members compatibly selected from hydrogen, chlorine, bromine, fluorine, branched or straight chained alkyls of one to ten carbon atoms compatibly substituted with chlorine, bromine, or fluorine, stirring the resulting aqueous suspension so as to produce spherical monomer droplets, polymerizing the droplets so as to form finely-divided polymeric beads comprising cross-linked poly (4-alkoxy) styrene, recovering the polymeric beads from the aqueous suspension, nitrating the recovered beads so as to form cross-linked (4-alkoxy-3-nitro) styrene, and then reacting the nitrated beads with an alkoxy cleavage agent so as to form finely-divided porous beads comprising cross-linked poly (4-alkoxy-3-nitro (nonsubstituted or alpha or beta substituted) styrene.

9. The process of claim 8 wherein the 4-alkoxy styrene and cross-linking agent are suspended in the aqueous media in the presence of a surface active agent.

10. The process of claim 1 wherein the cross-linking agent is selected from para-divinyl benzene, meta-divinyl benzene, vinyl cyclohexene, butadiene, diisopropenyl-benzene, 1, 4-divinyl cyclohexene, glycol dimethylacrylate, and divinyl acetylene.

11. The process of claim 4 wherein the substituted styrene is selected from 4-alkoxy alpha-methyl styrenes, 4 - alkoxy-alpha-fluorostyrenes, 4-alkoxy-alpha-trifluoromethyl styrenes, 4-alkoxy-beta-fluorostyrene, 4-alkoxy-isopropenyl styrene, 4-alkoxy-beta-bromostyrene, and 4-alkoxy-α,β,β-trifluorostyrene.

References Cited
FOREIGN PATENTS
1,009,906   11/1965   Great Britain _____ 260—47

OTHER REFERENCES
Wiley and Smith, J. Am. Chem. Soc., 72, 5198 (1950).
Fridkin, Patchornik and Katchalski, J. Am. Chem. Soc. 88, 3164–5 (1966).

JOSEPH L. SCHOFER, Primary Examiner

C. A. HENDERSON, Jr., Assistant Examiner

U.S. Cl. X.R.

260—80, 93.5, 112.5